United States Patent Office 3,600,422
Patented Aug. 17, 1971

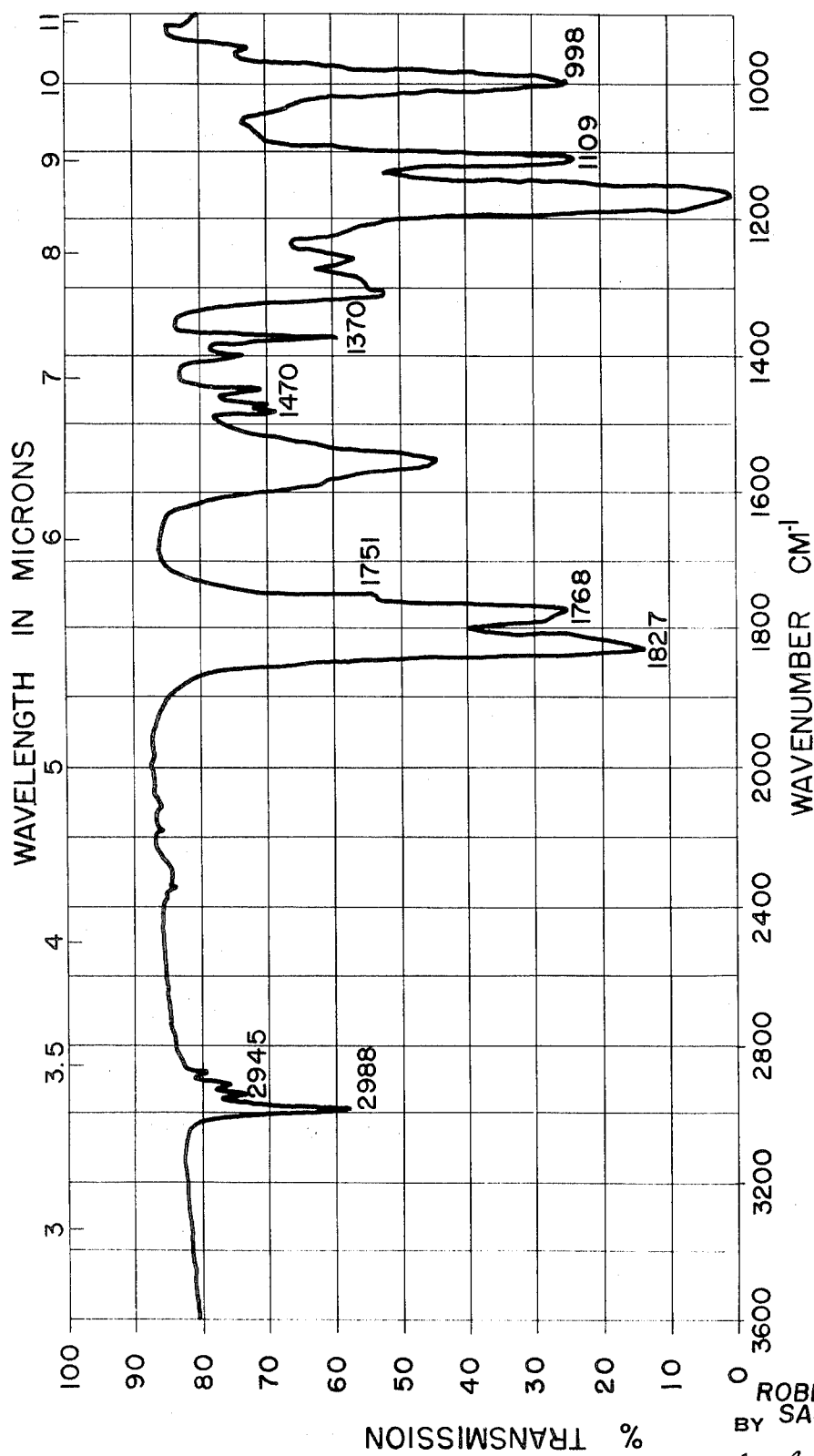

3,600,422
CARBONATE-GROUP-CONTAINING OXALIC ACID ANHYDRIDE
Robert K. Krueger, Oconomowoc, and Saul S. Weinstein, Milwaukee, Wis., assignors to Jos. Schlitz Brewing Company, Milwaukee, Wis.
Filed Nov. 25, 1966, Ser. No. 597,155
Int. Cl. C07c 69/100
U.S. Cl. 260—463                                   2 Claims

ABSTRACT OF THE DISCLOSURE

A mixed anhydride having particular use for eliminating the growth and reproduction of microorganisms and having the following formula:

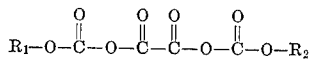

where $R_1$ and $R_2$ may be hydrogen or a carbon containing radical having up to 24 carbon atoms.

---

This invention relates to a substance to be used for eliminating the growth and reproduction of microorganisms.

Pyrocarbonic acid esters, such as diethylpyrocarbonate, have been used in the past for preserving perishable materials, such as fruit pulp, vegetables, pharmaceutical products and the like, and have the advantage of decomposing into materials which are compatible with food products so that the product of decomposition will not alter the flavor or aroma of the perishable material. Moreover, these decomposition products present no toxicity problems since they are normal constituents of most foods and beverages.

The present invention relates to a new group of mixed anhydrides which are more effective than the pyrocarbonates in eliminating microorganism activity. The compounds of the invention decompose to form products which are compatible with perishable materials so that they can be used to preserve a wide variety of perishable products as well as inert objects.

The mixed anhydrides of the invention correspond to the general formula:

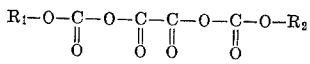

where $R_1$ and $R_2$ may be hydrogen or a carbon-containing radical having up to 24 carbon atoms such as lower alkyl, cycloalkyl, lower alkenyl, cycloalkenyl, lower alkynyl, cycloalkynyl, aryl, and mixed alkyl-aryl. These radicals can also include various substituents, for example, acetamido, acetoxy, acetyl, alkoxy, amino, benzoxy, bromo, chloro, cyano, epoxy, fluoro, hydroxy, iodo, keto, nitro, nitroso, phenoxy, sulfonyl, thio, and thionyl.

Of this group, oxalic bis (alkyl carbonic anhydrides), wherein the alkyl group contains up to 10 carbon atoms such as methyl, ethyl, n-propyl, isopropyl, butyl, isobutyl, sec-butyl, tert-butyl, isopentyl, n-pentyl, tert-pentyl, n-hexyl and the like, have proven particularly effective as sterilizing agents. However, within this group other compounds exist which possess antimicrobial activity.

The mixed anhydrides of the invention can be prepared by conventional techniques similar, except for the starting materials, to the processes described in Patent 3,219,-684 and in "The Stability of Mixed Carboxylic-Carbonic Anhydrides," Tarbell and Leister, August 1958, Journal of Organic Chemistry.

In general, the mixed anhydrides of the invention are prepared by dissolving oxalic acid and a tertiary amine in an organic solvent and then adding an alkyl chloroformate until a crystalline precipitate of the amine hydrochloride is formed. After the mixture is filtered, the filtrate contains the mixed anhydride.

The organic solvent to be used in the preparation of the mixed anhydride can be a conventional solvent such as toluene, chloroform, benzene, cyclohexane, tetrahydrofuran, carbon tetrachloride and other non-polar solvents. The minimum amount of solvent which may be used depends on the solubility of the reactants and generally from 5 to 20 parts by weight of solvent per part of oxalic acid are employed.

Among the tertiary amines which can be used are triethylamine, tributylamine, dimethyl aniline, N - ethyl piperidine, and pyridine.

Ethyl chloroformate is preferred as the alkyl chloroformate, but other appropriately substituted chloroformates, as for example, methyl, propyl and butyl chloroformates may also be used in the embodiment of this invention.

The reaction is generally carried out at atmospheric pressure at temperatures of about 0° C. to about −60° C. with the reaction period varying from about 10 minutes to about two hours. During the reaction, the amine hydrochloride by-product is precipitated and is removed from the reaction product by filtration. The reaction product is present in the filtrate consisting of a solvent such as ether, toluene, benzene, carbon tetrachloride and other non-polar solvents, and the solvent is then distilled off to provide the mixed anhydride reaction product of the invention.

It has been found that the mixed anhydrides of the invention are highly effective as preservatives for perishable materials, particularly materials containing carbohydrates and/or proteins, such as vegetables; fruits; fermented beverages, such as wine, ale, beer; pharmaceutical products and the like. In addition, the mixed anhydrides can be used as topical antiseptics, surgical sterilizers, aerospace sterilizers, medical antimicrobial pharmaceuticals, industrial sanitizers, laundry sterilants, insecticides, fungicides, and in any other application where it is desired to limit or prevent microorganism activity.

When used to preserve a perishable material, the mixed anhydride is used in an amount of .0001 to 2% by weight of the perishable material. The anhydrides decompose into food compatible compounds and do not leave any hazardous residue. Thus, the decomposition products will not alter the flavor or aroma of the perishable material or create health safety hazards.

When used as a sterilant or antiseptic, the mixed anhydrides can either be dissolved in water or in an alcoholic solution and applied in this form to the object to be sterilized. The concentration of the mixed anhydride in the solvent is not critical and can vary within wide limits depending upon the ultimate use.

It has been found that the mixed anhydrides of the invention are extremely effective against both higher and lower orders of microorganisms including bacteriophage and viruses.

PREPARATION OF OXALIC BIS (ETHYL CARBONIC ANHYDRIDES)

45.0 grams (0.5 mole) of anhydrous oxalic acid was suspended in 500 ml. of diethyl ether and cooled in an ice bath. 101.2 grams (1.0 mole) of triethyl amine was added with a slight rise in temperature occurring. When the temperature was near 0° C., 95.5 ml. (1.0 mole) of ethyl chloroformate was added dropwise with continuous stirring during the course of one hour. With continued stirring, the resulting mixture was allowed to come to room temperature in 1½ hours. The by-product, triethyl amine hydrochloride, was removed by vacuum filtration and washed with 250 ml. of diethyl ether. The ethereal filtrate containing the desired product was washed once with 200 ml. of water. The ether-product phase was collected and dried over anhydrous calcium chloride. After distilling off the ether under low vacuum, the oxalic bis (ethyl carbonic anhydride) was obtained by high vacuum distillation. Yield 60.0 grams (52.0%). Boiling point 53–55° C./0.5 mm.

PROOF OF STRUCTURE OF OXALIC BIS (ETHYL CARBONIC ANHYDRIDE)

Thermal decomposition: 1.5505 grams of oxalic bis (ethyl carbonic anhydride) was thermally decomposed at 178° C. The evolved gases were swept into a standardized sodium hydroxide solution by a stream of nitrogen. Titration of the resulting alkaline solution with standardized hydrochloric acid revealed that 0.6046 gram of carbon dioxide was liberated. Considering two molecules of carbon dioxide per molecule of anhydride, the theoretical weight of carbon dioxide was 0.5827 gram (103.7%). This proved the structural moiety of

—CO—O— to be repeated twice in the parent molecule.

Hydrolysis: Oxalic bis (ethyl carbonic anhydride) was hydrolyzed in an 0.1 N aqueous hydrochloric acid solution upon standing for two days at room temperature. The evolution of carbon dioxide was evidenced by a slow release of gas bubbles from the solution. The water and volatile hydrolysis products were removed from the solution by evaporation leaving a crystalline residue. By direct comparison, an infrared spectrum of this crystalline residue was identical to the infrared spectrum of authentic oxalic acid. Bands at 3003–2580 cm.$^{-1}$, (strong,

—CO—OH)

1770 cm.$^{-1}$ (strong, —CO—OH); 1745 cm.$^{-1}$ (strong, —CO—CO—). The structural moiety

—O—CO—CO—O— was thus proven to be present in the parent compound.

Anilide formation: A solution of 3.0 grams of aniline in 30 ml. of benzene was added to 2.0 grams of oxalic bis (ethyl carbonic anhydride), and the solution was warmed on a steam bath for two minutes. The cooled solution was washed successively with 2 ml. of water, 5 ml. of 5% hydrochloric acid, 5 ml. of 5% sodium hydroxide solution, and 2 ml. of water. The benzene was evaporated, and the anilide was recrystallized from 95% ethanol. An infrared spectrum of this derivative melting at 48° C. was identical by direct comparison to an infrared spectrum of authentic N-phenyl ethyl carbamate (phenylurethane) melting at 51° C. Bands at 3425 cm.$^{-1}$ (medium, —NH—); 1733 cm.$^{-1}$ (strong, —O—CO—NH—); 1605 cm.$^{-1}$ (medium, $C_6H_5$—); 1480 cm.$^{-1}$ (weak, —$CH_2$—); 1380 cm.$^{-1}$ (weak, —$CH_3$). The parent anhydride molecule was thus proven to contain the structural moiety of —CO—O—$CH_2CH_3$.

Infrared spectrum: The infrared spectrum of a 2% solution of oxalic bis (ethyl carbonic anhydride) was scanned against a carbon tetrachloride reference from 4000 to 400 cm.$^{-1}$, and a portion of the spectrum is shown in the drawing. The following table lists the major spectral bands and the structure corresponding to these band positions.

| Bands cm.$^{-1}$: | Assignments |
|---|---|
| 2988 | —$CH_3$ |
| 2945 | —$CH_2$ |
| 1827 (ΔCO, 59 cm.$^{-1}$) | —CO—O—CO— |
| 1768 | —CO—O—CO— |
| 1751 (shoulder) | —CO—CO— |
| 1470 | —$CH_2$— |
| 1370 | —$CH_3$ |
| 1163 | C—O—C |
| 1109 | —CO—O—CO— |
| 998 | —CO—O—CO— |

Mass spectrum: A 70 electron volt mass spectrum of oxalic bis (ethyl carbonic anhydride) was scanned. No parent molecular ion was observed due to the instability of anhydrides under electron impact. The major fragment ion peaks were correlated with structural groups as follows:

| M./e. | Structural group producing ions |
|---|---|
| 28 | CO |
| 29 | —$C_2H_5$ |
| 44 | $CO_2$ |
| 45 | —O—$C_2H_5$ |
| 63 | —O—CO—O— |
| 75 | —CO—O—$C_2H_5$ |
| 91 | —O—CO—O—$C_2H_5$ |
| 119 | —CO—O—CO—O—$C_2H_5$ |
| 147 | —CO—CO—O—CO—O—$C_2H_5$ |

From the results of functional group and instrumental analyses, the compound was determined to have the following structure:

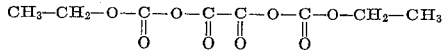

representing oxalic bis(ethyl carbonic anhydride).

ANTIMICROBIAL PROPERTIES OF OXALIC BIS (ETHYL CARBONIC ANHYDRIDES)

An investigation was carried out to determine the action of oxalic bis (ethyl carbonic anyhdride) on a wild and culture yeast mixture. A mixture of ten different 48-hr. old, naturally occurring beer wild and culture yeasts was added to beer. The calculated amount of oxalic bis (ethyl carbonic anhydride) was first dissolved in ethanol and then a known aliquot of this solution was added to a series of empty beer bottles prior to filling with the infected beer to provide, after filling, concentrations of oxalic bis (ethyl carbonic anyhdride) of 50, 100, and 150 p.p.m. respectively. Untreated control bottles were obtained of the same beer. After addition of the anhydride the bottles were filled, capped immediately, and incubated at room temperature for one and two weeks respectively. After incubation, the samples were examined for microbiological growth using the Millipore filtration technique. The results are shown in the following table:

| Concentration of oxalic bis (ethyl carbonic anhydride) p.p.m. | Microorganism count | | | | | |
|---|---|---|---|---|---|---|
| | Original (per ml.) | | 7 days (per 100 ml.) | | 14 days (per 100 ml.) | |
| | Aerobic | Anaer. | Aerobic | Anaer. | Aerobic | Anaer. |
| 0 | TNTC* | TNTC | TNTC | TNTC | TNTC | TNTC |
| 50 | TNTC | TNTC | 4 | 2 | 0 | 0 |
| 100 | TNTC | TNTC | 0 | 0 | 0 | 0 |
| 150 | TNTC | TNTC | 0 | 0 | 0 | 0 |

*TNTC: too numerous to count.

The results above indicate that the microorganism count of the control sample, containing no oxalic bis (ethyl carbonic anhydride) was not reduced during the incubation period. On the other hand, the samples containing various concentrations of the chemical from 50–150 p.p.m., reduced the microorganism count in all cases, so that after two weeks no microorganism was present in the samples.

The sterilizing properties of oxalic bis (ethyl carbonic anhydride) were investigated in fruit juice, microbiological media, and also in water sampled from an open creek which showed a high degree of contamination with various types of microorganisms. Each product was prepared in 100 ml. quantities and to each portion 0.5 ml. of wild and culture yeast mixture was added in addition to naturally occurring microorganisms present in the samples. This gave approximately 15–20 million microorganisms per ml. of sample. The calculated amount of oxalic bis (ethyl carbonic anhydride) was first dissolved in ethanol and then an 0.5 ml. aliquot was added to each portion of the product to provide concentrations of oxalic bis (ethyl carbonic anhydride) of 50, 100 and 150 p.p.m. respectively. In addition, control samples which do not contain the compounds were also prepared. After addition, the bottles were incubated at room temperature for 7 and 14 days respectively. After incubation the undiluted samples were examined for the growth of yeast and bacteria using a plating technique. The results are shown in the following table:

| Product | Concentration of oxalic bis (ethyl carbonic anhydride) p.p.m. | Microorganism count, per ml. | | | | | |
|---|---|---|---|---|---|---|---|
| | | Original | | 7 days | | 14 days | |
| | | Aerobic | Anaer. | Aerobic | Anear. | Aerobic | Anear. |
| Grape juice | 0 | Approximately 15,000,000 | | TMTC | TNTC | TNTC | TNTC |
| | 50 | | | 12,000 | 13,000 | 14,000 | 11,000 |
| | 100 | | | 500 | 600 | 900 | 950 |
| | 150 | | | 0 | 0 | 0 | 0 |
| Nutrient broth | 0 | Approximately 17,000,000 | | TNTC | TNTC | TNTC | TNTC |
| | 50 | | | 1,352 | 1,788 | 0 | 0 |
| | 100 | | | 790 | 760 | 0 | 0 |
| | 150 | | | 88 | 22 | 0 | 0 |
| Dextrose solution, 2% | 0 | Approximately 15,000,000 | | TNTC | TNTC | TNTC | TNTC |
| | 50 | | | 1,000 | 2 | 0 | 0 |
| | 100 | | | 200 | 0 | 0 | 0 |
| | 150 | | | 0 | 0 | 0 | 0 |
| Creek water | 0 | Approximately 25,000,0000 | | TNTC | TNTC | TNTC | TNTC |
| | 50 | | | 1,200 | 1 | 0 | 0 |
| | 100 | | | 400 | 0 | 0 | 0 |
| | 150 | | | 10 | 0 | 0 | 0 |

The results set forth in the above table indicate that oxalic (ethyl carbonic anhydride) is extremely effective against microorganisms. In all solutions the microorganism count was reduced to zero in 14 days by the addition of 150 p.p.m. of the anhydride.

PREPARATION OF OXALIC BIS (N-PROPYL CARBONIC ANHYDRIDE)

31.5 grams (0.25 mole) of oxalic acid dihydrate and 50.5 grams (0.5 mole) of triethyl amine were suspended in 250 ml. of diethyl ether. The suspension was cooled to 0° C. and treated dropwise with 56.1 ml. (0.5 mole) of n-propyl chloroformate under vigorous stirring in about 30 minutes. The resulting mixture was stirred overnight while being allowed to come to room temperature. The triethyl amine hydrochloride, which was formed in the reaction, was removed by vacuum filtration and washed with 200 ml. of ether. The ethereal filtrate was washed once with 100 ml. of 5% sodium bicarbonate and once with 100 ml. of water. After drying the ether-product phase over anhydrous calcium chloride, the diethyl ether was distilled off under reduced pressure. The pure product, oxalic bis(n-propyl carbonic anhydride), was then obtained by vacuum distillation. Yield 24.0 grams (36.6%). Boiling point 78° C./3.5 mm.

STERILIZING PROPERTIES OF OXALIC BIS (N-PROPYL CARBONIC ANHYDRIDE) USING CONTAMINATED BEER

The sterilizing properties of oxalic bis (n-propyl carbonic anhydride) were determined in the manner set forth with respect to the oxalic bis (ethyl carbonic anhydride). Concentrations of 50, 100 and 150 p.p.m., respectively, of oxalic bis (n-propyl carbonic anhydride) were added to a series of empty beer bottles prior to filling with the infected beer. Untreated control bottles were obtained of the same beer. After the addition of the anhydride, the bottles were filled, capped immediately and incubated at room temperature for 1 and 2 weeks respectively. After incubation the samples were examined for microbiological growth and the results are shown in the following table:

| Concentration of oxalic bis (n-propyl carbonic anhydride) p.p.m. | Microorganism count | | | | | |
|---|---|---|---|---|---|---|
| | Original (per ml.) | | 7 days (per 100 ml.) | | 14 days (per 100 ml.) | |
| | Aerobic | Anaer. | Aerobic | Anaer. | Aerobic | Anaer. |
| 0 | TNTC | TNTC | TNTC | TNTC | TNTC | TNTC |
| 50 | TNTC | TNTC | 17 | 208 | 0 | 100 |
| 100 | TNTC | TNTC | 1 | 0 | 0 | 0 |
| 150 | TNTC | TNTC | 1 | 0 | 0 | 0 |

The results set forth in the above table indicate that oxalic bis (n-propyl carbonic anhydride) is extremely effective in eliminating microorganism growth.

PREPARATION OF OXALIC BIS (N-PENTYL CARBONIC ANHYDRIDE 22.5 grams (0.25 mole) of oxalic acid and 50.5 grams (0.5 mole) of triethyl amine were suspended in 500 ml. of diethyl ether and cooled to 5° C. During the course of one hour, 75.3 grams (0.5 mole) of n-pentyl chloroformate was added dropwise with vigorous stirring. Under continued stirring, the reaction mixture was allowed to come to room temperature in 1½ hours. The triethyl amine hydrochloride was removed by vacuum filtration and washed with 200 ml. of ether. The ethereal filtrate was washed with 200 ml. of 5% sodium bicarbonate and then with 200 ml. of water. The resultant ether-product phase was thoroughly dried over anhydrous calcium chloride. After removing the drying agent by gravity filtration, the ether was distilled off on a rotating thin-film vacuum evaporator. The liquid residue was oxalic bis (n-pentyl carbonic anhydride). Yield 54.9 grams 69.0%).

STERILIZING PROPERTIES OF OXALIC BIS (N-PENTYL CARBONIC ANHYDRIDE) USING CONTAMINATED BEER

The sterilizing properties of oxalic bis (n-pentyl carbonic anhydride) were determined in the manner described with repect to oxalic bis (ethyl carbonic anhydride). 50, 100 and 150 p.p.m. concentrations of oxalic bis (n-pentyl carbonic anhydride) were introduced into bottles prior to filling the bottles with the infected beer. Untreated control bottles were obtained of the same beer.

After addition of the anhydride, the bottles were filled, capped and incubated at room temperature for one and two weeks respectively. After incubation the samples were examined for microbiological growth and the results are shown in the following tables.

| Sterilizing agent | Conc. p.p.m. | Microorganism count per 100 ml. | | | | | |
|---|---|---|---|---|---|---|---|
| | | Original | | 7 days | | 14 days | |
| | | Aerobic | Anaer. | Aerobic | Anaer. | Aerobic | Ana |
| Diethyl pyrocarbonate | 0 | TNTC | TNTC | TNTC | TNTC | TNTC | TNTC |
| | 50 | TNTC | TNTC | 7 | 7 | 15 | 2 |
| | 100 | TNTC | TNTC | 0 | 0 | 0 | 0 |
| | 150 | TNTC | TNTC | 0 | 0 | 0 | 0 |
| Malonic bis (ethyl carbonic anydride) | 0 | TNTC | TNTC | TNTC | TNTC | TNTC | TNTC |
| | 50 | TNTC | TNTC | 283 | 223 | 267 | 290 |
| | 100 | TNTC | TNTC | 20 | 16 | 10 | 19 |
| | 150 | TNTC | TNTC | 0 | 0 | 0 | 3 |
| Oxalic bis (ethyl carbonic anhydride) | 0 | TNTC | TNTC | TNTC | TNTC | TNTC | TNTC |
| | 50 | TNTC | TNTC | 4 | 2 | 0 | 0 |
| | 100 | TNTC | TNTC | 0 | 0 | 0 | 0 |
| | 150 | TNTC | TNTC | 0 | 0 | 0 | 0 |

| Concentration of oxalic bis (n-pentyl carbonic anhydride) p.p.m. | Microorganism count | | | | | |
|---|---|---|---|---|---|---|
| | Original (per ml.) | | 7 days (per 100 ml.) | | 14 days (per 100 ml.) | |
| | Aerobic | Anaer. | Aerobic | Anaer. | Aerobic | Anaer. |
| 0 | TNTC | TNTC | TNTC | TNTC | TNTC | TNTC |
| 50 | TNTC | TNTC | 221 | 5 | 5 | 0 |
| 100 | TNTC | TNTC | 63 | 0 | 0 | 0 |
| 150 | TNTC | TMTC | 0 | 0 | 0 | 0 |

The results shown in the above table indicate that oxalic bis (n-pentyl carbonic anhydride) is extremely effective against microorganism growth. The microorganism count of the beer was reduced after both 7 and 14 days of incubation to zero, using a concentration of 150 p.p.m. of the anhydride.

Tests were also conducted to compare the sterilizing properties of the mixed anhydride of the invention with a known sterilizing agent, diethyl pyrocarbonate, as disclosed in Patent 2,910,400, and with the mixed anhydride, malonic bis (ethyl carbonic anhydride). In conducting these tests, a mixture of ten naturally-occurring beer wild and culture yeasts were added to the beer prior to treatment with the sterilizing agents. Control bottles were obtained of the same beer and the sterilizing agents were added in the amounts of 50, 100, and 150 p.p.m. concentrations to the finished beer. The calculated amount of the sterilizing agent under investigation was first dissolved in a solvent and then a known aliquot of solution was added to the empty beer bottle prior to filling with the infected beer. After the addition of the sterilizing agents the bottles were filled and capped immediately. The beer was incubated at room temperature and the bottles were examined after one and two weeks of incubation for yeast growth using the Milliport filtration technique. The results of these experiments are shown in the following table:

The results set forth in the above table indicate that the mixed anhydride of the invention, oxalic bis (ethyl carbonic anhydride), was markedly more effective as a sterilizing agent than either diethyl pyrocarbonate or malonic bis (ethyl carbonic anhydride).

Various modes of carrying out the invention are contemplated as being within the scope of the following claims particularly pointing out and distinctly claiming the subject matter which is regarded as the invention.

We claim:

1. A mixed anhydride having the following formula:

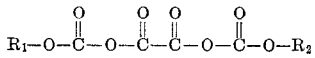

wherein $R_1$ and $R_2$ are alkyl groups having from one to ten carbon atoms.

2. The compound of claim 1, in which $R_1$ and $R_2$ are ethyl groups.

References Cited

UNITED STATES PATENTS

| | | | |
|---|---|---|---|
| 3,219,684 | 11/1965 | Windholz | 260—463 |
| 3,326,958 | 6/1967 | Curtius et al. | 260—463 |
| 3,030,331 | 4/1962 | Goldberg | 260—463X |

LEON ZITVER, Primary Examiner

L. D. CESCENTE, Assistant Examiner

U.S. Cl. X.R.

424—301